United States Patent
Yamamoto et al.

(10) Patent No.: US 8,117,716 B2
(45) Date of Patent: Feb. 21, 2012

(54) ONE-WAY VALVE AND DOOR CHECK APPARATUS

(75) Inventors: Kenji Yamamoto, Kanagawa (JP); Yoshiteru Igarashi, Kanagawa (JP); Akihiko Okimura, Kanagawa (JP)

(73) Assignees: Shiroki Kogyo Co., Ltd., Kanagawa (JP); Oiles Corporation, Kanagawa (JP)

( * ) Notice: Subject to any disclaimer, the term of this patent is extended or adjusted under 35 U.S.C. 154(b) by 490 days.

(21) Appl. No.: 12/303,503

(22) PCT Filed: Jun. 5, 2007

(86) PCT No.: PCT/JP2007/061335
§ 371 (c)(1),
(2), (4) Date: Dec. 4, 2008

(87) PCT Pub. No.: WO2007/142218
PCT Pub. Date: Dec. 13, 2007

(65) Prior Publication Data
US 2009/0193617 A1 Aug. 6, 2009

(30) Foreign Application Priority Data

Jun. 5, 2006 (JP) .................................. 2006-156209
Jun. 27, 2006 (JP) .................................. 2006-176184

(51) Int. Cl.
*E05F 3/22* (2006.01)
(52) U.S. Cl. ... 16/54; 16/334; 16/50; 16/51; 296/146.11
(58) Field of Classification Search ................ 16/49, 51, 16/52, 54, 50, 374, 375, 378, 334, DIG. 7, 16/DIG. 9, DIG. 12, DIG. 20, 335, 343, 344; 296/146.11, 146.1, 146.12
See application file for complete search history.

(56) References Cited

U.S. PATENT DOCUMENTS

| 2,964,783 | A | * | 12/1960 | Engels | 16/68 |
| 5,410,777 | A | * | 5/1995 | Gruber | 16/58 |
| 5,586,361 | A | * | 12/1996 | Tolle et al. | 16/51 |
| 6,073,308 | A | * | 6/2000 | Linnenbrink et al. | 16/334 |
| 6,457,207 | B1 | * | 10/2002 | Horberg | 16/50 |
| 7,203,996 | B2 | * | 4/2007 | Linnenbrink et al. | 16/334 |
| 7,461,432 | B2 | * | 12/2008 | Lowen et al. | 16/334 |
| 2003/0093873 | A1 | * | 5/2003 | Linnenbrink | 16/85 |
| 2008/0309118 | A1 | * | 12/2008 | Kohlstrand | 296/146.1 |
| 2009/0139057 | A1 | * | 6/2009 | Honda et al. | 16/343 |

FOREIGN PATENT DOCUMENTS

DE 3642442 C1 * 8/1987

(Continued)

*Primary Examiner* — Chuck Y. Mah
(74) *Attorney, Agent, or Firm* — Finnegan, Henderson, Farabow, Garrett & Dunner L.L.P.

(57) ABSTRACT

A one-way valve having a conduit for allowing liquid to flow therein, a valve element provided in the conduit, a hole portion provided in the conduit on the upstream side of the valve element and configured to be brought into a closed state by being closed by the valve element, and a spring that urges the valve element in the direction to close the hole portion, in which the peripheral surface of the valve element is formed with a first surface and a second surface intersecting the direction of movement of the valve element and generating a component force in the direction to close the hole portion when an urging force of the spring is applied, the first surface and the second surface are formed so as to increase the component force in the direction to close the hole portion as the valve element approaches the hole.

6 Claims, 11 Drawing Sheets

FOREIGN PATENT DOCUMENTS

| | | |
|---|---|---|
| DE | 19855710 A1 * | 7/2000 |
| JP | 2-58139 | 4/1990 |
| JP | 2002-81482 | 3/2002 |
| JP | 2003-185299 | 7/2003 |
| JP | 2004-69064 | 3/2004 |
| JP | 2006-17211 | 1/2006 |

* cited by examiner (a)

(b)

(c)

(a)

(b)

(a)

(b)

(c)

E-E

F-F

ONE-WAY VALVE AND DOOR CHECK APPARATUS

CROSS-REFERENCE TO RELATED APPLICATIONS

None.

BACKGROUND OF THE INVENTION

The present invention relates to a one-way valve and a door check apparatus.

FIELD OF THE INVENTION

In Patent Document 1 shown below, a one-way valve in which a valve element is held at the closing position by a large force and, when it is moved in the opening direction, the force for holding the valve element is lowered is disclosed.
Patent Document 1: JP-A-2004-69064 (paragraph No. 0046, FIG. 13)

However, in the one-way valve disclosed in Patent Document 1, two types of urging means, that is, first urging means for urging the valve element in the axial direction and second urging means for tightening the valve element in the radial direction are needed, and hence there is a problem such that the one-way valve is upsized, and the number of components increase.

In view of such problem, it is an object of the present invention to provide a one-way valve and a door check apparatus which is compact and includes a small number of components.

BRIEF SUMMARY OF THE INVENTION

According to a first embodiment of the invention, a one-way valve is provided comprising a conduit which allows liquid to flow therein; a valve element provided so as to be movable in the conduit; a hole portion provided in the conduit on the upstream side of the valve element and configured to be brought into a closed state by being closed by the valve element; and urging means that urges the valve element in the direction to close the hole portion, wherein the urging means is provided on one of the conduit side and the valve element side, a surface which intersects the direction of movement of the valve element and generates a component force in the direction to close the hole portion in the valve element when an urging force of the urging means is applied thereon is formed on the other one of the conduit side and the valve element side, the surface is formed so as to generate a larger component force in the direction to close the hole portion as the valve element approaches the hole portion, and the urging means constantly presses the surface from the direction intersecting the direction of movement of the valve element to constantly apply the urging force on the valve element in the direction to close the hole portion.

When the urging force of the urging means is applied to the surface, the component force in the direction to close the hole is generated in the valve element, and the valve element is urged in the direction to close the hole portion.

When the valve element moves in the direction away from the hole portion against the urging force of the urging means by the pressure of the liquid flowing in the conduit, the component force of the urging means in the direction to close the hole portion is reduced. When the pressure of the liquid flowing in the conduit is eliminated, the valve element closes the hole portion quickly by the component force of the urging force of the urging means in the direction to close the hole portion.

In this embodiment of the invention, the surface may be one of a plurality of surfaces or a curved surface.

In a second embodiment of the invention, a door check apparatus is provided that comprises: a pump having a first liquid discharge port and a second liquid discharge port for discharging liquid from a first liquid discharge port or a second liquid discharge port according to the direction of rotation of a door; a first conduit and a second conduit connected at one end thereof to the first liquid discharge port of the pump and at the other end thereof to the second liquid discharge port of the pump respectively; a first one-way valve having: a valve element provided in the first conduit; a hole portion provided in the first conduit on the upstream side of the valve element and configured to be brought into a closed state by being closed by the valve element; and urging means that urges the valve element in the direction to close the hole portion, in which the urging means is provided on one of the first conduit side and the valve element side, a surface which intersects the direction of movement of the valve element and generates a component force in the direction to close the hole portion in the valve element when an urging force of the urging means is applied thereon is formed on the other one of the first conduit side and the valve element side, the surface is formed so as to generate a larger component force in the direction to close the hole portion as the valve element approaches the hole portion, the urging means constantly presses the surface from the direction intersecting the direction of movement of the valve element to constantly apply the urging force on the valve element in the direction to close the hole portion, and the flow of the liquid from the interior of the pump through the first liquid discharge port to the interior of the first conduit is allowed and the flow of the liquid in the opposite direction is prevented; and a second one-way valve having: a valve element provided in the second conduit, a hole portion provided in the second conduit on the upstream side of the valve element and configured to be brought into a closed state by being closed by the valve element, and an urging means that urges the valve element in the direction to close the hole portion, in which the urging means is provided on one of the second conduit side and the valve element side, a surface which intersects the direction of movement of the valve element and generates a component force in the direction to close the hole portion in the valve element when an urging force of the urging means is applied thereon is formed on the other one of the second conduit side and the valve element side, the surface is formed so as to generate a larger component force in the direction to close the hole portion as the valve element approaches the hole portion, the urging means constantly presses the surface from the direction intersecting the direction of movement of the valve element to constantly apply the urging force on the valve element in the direction to close the hole portion, and the flow of the liquid from the interior of the pump through the second liquid discharge port to the interior of the second conduit is allowed and the flow of the liquid in the opposite direction is prevented.

When the urging forces of the urging means of the first one-way valve and the second one-way valve are applied, the component force in the direction to close the hole portions is generated in the valve elements, and the valve elements are urged in the direction to close the hole portions, and close the hole portions.

When the door rotates, the liquid is discharged from one of the first liquid discharge port and the second liquid discharge port of the pump according to the direction of rotation of the door.

When the liquid is discharged from the first liquid discharge port of the pump, the valve element of the first one-way valve is pressed by the liquid pressure in the direction away from the hole portion. Also, the valve element of the second one-way valve is pressed by the liquid pressure in the direction to close the hole portion. Then, when the valve element of the first one-way valve is moved in the direction away from the hole portion against the urging force of the urging means, the component force of the urging force of the urging means in the direction to close the hole portion is reduced. When the rotation of the door is stopped, the valve element of the first one-way valve quickly closes the hole portion by the component force of the urging force of the urging means in the direction to close the hole portion.

In contrast, when the liquid is discharged from the second liquid discharge port, the valve element of the second one-way valve is pressed by the liquid pressure in the direction away from the hole portion. Also, the valve element of the first one-way valve is pressed by the liquid pressure in the direction to close the hole portion. Then, when the valve element of the second one-way valve is moved in the direction away from the hole portion against the urging force of the urging means, the component force of the urging force of the urging means in the direction to close the hole portion is reduced. When the rotation of the door is stopped, the valve element of the second one-way valve quickly closes the hole portion by the component force of the urging force of the urging means in the direction to close the hole portion.

In a third embodiment of the invention a door check apparatus is provided that comprises: a casing to be filled with liquid; a shaft arranged in the casing rotatably supported by a first portion and a second portion of the casing which oppose to each other; a flap provided on a peripheral surface of the shaft for dividing the interior of the casing into a first chamber and a second chamber; a first conduit and a second conduit provided respectively on the flap in such a manner that one of the openings faces the first chamber and the other opening faces the second chamber; a first one-way valve having: a valve element provided in the first conduit; a hole portion provided in the first conduit on the upstream side of the valve element and configured to be brought into a closed state by being closed by the valve element; and urging means that urges the valve element in the direction to close the hole portion, in which the urging means is provided on one of the first conduit side and the valve element side, a surface which intersects the direction of movement of the valve element and generates a component force in the direction to close the hole portion in the valve element when an urging force of the urging means is applied thereon is formed on the other one of the first conduit side and the valve element side, the surface is formed so as to generate a larger component force in the direction to close the hole portion as the valve element approaches the hole portion, the urging means constantly presses the surface from the direction intersecting the direction of movement of the valve element to constantly apply the urging force on the valve element in the direction to close the hole portion, and the flow of the liquid from the first chamber to the second chamber is allowed and the flow of the liquid from the second chamber to the first chamber is prevented; and a second one-way valve having: a valve element provided in the second conduit, a hole portion provided in the second conduit on the upstream side of the valve element and configured to be brought into a closed state by being closed by the valve element, and an urging means that urges the valve element in the direction to close the hole portion, in which the urging means is provided on one of the second conduit side and the valve element side, a surface which intersects the direction of movement of the valve element and generates a component force in the direction to close the hole portion in the valve element when an urging force of the urging means is applied thereon is formed on the other one of the second conduit side and the valve element side, the surface is formed so as to generate a larger component force in the direction to close the hole portion as the valve element approaches the hole portion, the urging means constantly presses the surface from the direction intersecting the direction of movement of the valve element to constantly apply the urging force on the valve element in the direction to close the hole portion, and the flow of the liquid from the second chamber to the first chamber is allowed and the flow of the liquid from the first chamber to the second chamber is prevented.

When the shaft rotates, the liquid flows to the first conduit and the second conduit.

When the liquid flows from the first chamber to the second chamber, the valve element of the first one-way valve in the first conduit is pressed by the liquid pressure in the direction away from the hole portion. Also, the valve element of the second one-way valve in the second conduit is pressed by the liquid pressure in the direction to close the hole portion. Then, when the valve element of the first one-way valve is moved in the direction away from the hole portion against the urging force of the urging means, the component force of the urging force of the urging means in the direction to close the hole portion is reduced. Then, when the rotation of the door is stopped, the valve element of the first one-way valve quickly closes the hole portion by the component force of the urging force of the urging means in the direction to close the hole portion.

In contrast, when the liquid flows from the second chamber to the first chamber, the valve element of the second one-way valve in the second conduit is pressed by the liquid pressure in the direction away from the hole portion. Also, the valve element of the first one-way valve in the first conduit is pressed by the liquid pressure in the direction to close the hole portion. Then, when the valve element of the second one-way valve is moved in the direction away from the hole portion against the urging force of the urging means, the component force of the urging force of the urging means in the direction to close the hole portion is reduced. Then, when the rotation of the door is stopped, the valve element of the second one-way valve quickly closes the hole portion by the component force of the urging force of the urging means in the direction to close the hole portion.

The third embodiment of the invention may include: a packing formed of an elastic material, the elastic material including: a flap seal portion provided along surfaces of the flap opposing the inner wall surface of the casing other than surfaces opposing the first chamber and the second chamber and pressed against the inner wall surface of the casing; an annular first shaft seal portion connected to one end portion of the flap seal portion, provided in the circumferential direction of the shaft on the peripheral surface of the shaft, and pressed against the inner wall surface of the first portion of the casing; an annular second shaft seal portion connected to the other end portion of the flap seal portion, provided in the circumferential direction of the shaft on the peripheral surface of the shaft, and pressed against the inner wall surface of the second portion of the casing; and a third shaft seal portion connected to the first shaft seal portion at one end portion thereof and to the second shaft seal portion at the other end portion thereof, having a midsection extending on the peripheral surface of the shaft along the axial direction of the shaft, and pressed against the inner wall surface of the casing; and characterized in that a groove is formed on the flap and the shaft for fitting the packing.

The second embodiment of the invention may include: a casing to be filled with the liquid; a shaft arranged in the casing, rotatably supported by a first portion and a second portion of the casing opposing to each other and rotating according to the rotation of the door; a flap provided on the peripheral surface of the shaft for dividing the interior of the casing into a first chamber and a second chamber; a first liquid discharge port provided on the first chamber side of the casing; and a second liquid discharge port provided on the second chamber side of the casing, and the pump discharges the liquid from the first liquid discharge port or the second liquid discharge port according to the direction of rotation of the shaft; in that a packing formed of an elastic material is provided, the packing having: a flap seal portion provided along surfaces of the flap opposing the inner wall surface of the casing other than surfaces opposing the first chamber and the second chamber and pressed against the inner wall surface of the casing; an annular first shaft seal portion connected to one end portion of the flap seal portion, provided in the circumferential direction of the shaft on the peripheral surface of the shaft, and pressed against the inner wall surface of the first portion of the casing; an annular second shaft seal portion connected to the other end portion of the flap seal portion, provided in the circumferential direction of the shaft on the peripheral surface of the shaft, and pressed against the inner wall surface of the second portion of the casing; and a third shaft seal portion connected to the first shaft seal portion at one end portion thereof and to the second shaft seal portion at the other end portion thereof, having a midsection extending on the peripheral surface of the shaft along the axial direction of the shaft, and pressed against the inner wall surface of the casing; and in that a groove is formed on the flap and the shaft for fitting the packing.

The invention may also be characterized in that the peripheral surface of the shaft on the side of the first portion of the casing includes a first flange portion having a surface flush with the surface on which one end portion of the flap seal portion of the flap is provided and having a diameter larger than the diameter of the shaft, the peripheral surface of the shaft on the side of the second portion of the casing includes a second flange portion having a surface flush with the surface on which the other end portion of the flap seal portion of the flap is provided, and having the same diameter as the first flange portion, the shaft is formed with an axial projection along the axial direction thereof from the first flange portion to the second flange portion, the axial projection extends so as to be flush with the peripheral surface of the first flange portion and the peripheral surface of the second flange portion, the first flange portion includes a first shaft seal portion of the packing, the second flange portion includes a second shaft seal portion of the packing, and the axial projection includes a third shaft seal portion of the packing.

The invention as described above may further be characterized in that the first flange portion includes a column-shaped first shoulder extending toward the first portion, being coaxial with the first flange portion and having a diameter smaller than that of the first flange portion and larger than that of the shaft on the surface opposing the first portion of the casing, the second flange portion includes a column-shaped second shoulder extending toward the second portion, being coaxial with the second flange portion, and having a diameter smaller than that of the second flange portion and larger than that of the shaft on the surface opposing the second portion of the casing, the first portion and the second portion of the casing opposing to each other are formed with a first hole and a second hole for allowing insertion of the shaft, the first hole of the first portion of the casing includes a first larger diameter portion having a diameter smaller than that of the first flange portion and larger than that of the first shoulder, and a first small diameter portion having a diameter smaller than that of the first shoulder and larger than that of the shaft, and the second hole of the second portion of the casing includes a second large diameter portion having a diameter smaller than that of the second flange portion and larger than that of the second shoulder, and a second small diameter portion having a diameter smaller than that of the second shoulder and larger than that of the shaft.

In accordance with one aspect of the invention, the urging means for urging the valve element in the axial direction can be omitted, and hence downsizing and reduction of the number of components are achieved.

According to another aspect of the invention, the surface which intersects the direction of movement of the valve element and generates the component force in the valve element in the direction to close the hole portion when the urging force of the urging means is applied is formed on the other one of the conduit side and the valve element side, and the surface is formed so as to increase the component force in the direction to close the hole portion as the valve element approaches the hole portion, so that by setting the shape of the surface appropriately, the component force in the direction to close applied to the valve element when the valve element is in the state of closing the hole portion or the component force in the direction to close the hole portion applied to the valve element when the valve element is moved in the direction away from the hole portion can be set as desired.

According to yet another aspect of the invention, in the second embodiment, the first conduit and the second conduit are provided on the flap in such a manner that one of the openings faces the first chamber and the other opening faces the second chamber, and hence downsizing of the apparatus is achieved in comparison with the second embodiment of the invention.

According to one aspect of the invention, there is provided the packing formed of an elastic material having: the flap seal portion provided along the surfaces of the flap opposing the inner wall surface of the casing other than the surfaces opposing the first chamber and the second chamber and pressed against the inner wall surface of the casing; the annular first shaft seal portion connected to one end portion of the flap seal portion, provided in the circumferential direction of the shaft on the peripheral surface of the shaft, and pressed against the inner wall surface of the first portion of the casing; the annular second shaft seal portion connected to the other end portion of the flap seal portion, provided in the circumferential direction of the shaft on the peripheral surface of the shaft, and pressed against the inner wall surface of the second portion of the casing; and a third shaft seal portion connected to the first shaft seal portion at one end portion thereof and to the second shaft seal portion at the other end portion thereof, having a midsection extending on the peripheral surface of the shaft along the axial direction of the shaft, and pressed against the inner wall surface of the casing. In other words, since the packing is an integral member, a good sealing property is achieved.

With the formation of the groove on the flap and the shaft for fitting the packing, the packing hardly comes apart. Since the packing has elasticity, it is easy to attach.

The peripheral surface of the shaft on the side of the first portion of the casing includes a first flange portion having a surface flush with the surface on which one end portion of the flap seal portion of the flap is provided and having a diameter larger than the diameter of the shaft, the peripheral surface of the shaft on the side of the second portion of the casing includes a second flange portion having a surface flush with the surface on which the other end portion of the flap seal portion of the flap is provided, and having the same diameter as the first flange portion, the shaft is formed with an axial projection along the axial direction thereof from the first flange portion to the second flange portion, the axial projection extends so as to be flush with the peripheral surface of the first flange portion and the peripheral surface of the second flange portion, the first flange portion includes a first shaft seal portion of the packing, the second flange portion includes a second shaft seal portion of the packing, and the axial projection includes a third shaft seal portion of the packing.

In other words, the first flange portion has a surface flush with the surface where one end portion of the flap seal portion of the flap is provided. The second flange portion has a surface flush with the surface where the other end portion of the flap seal portion of the flap is provided. Furthermore, the axial projection extends so as to be flush with the peripheral surface of the first flange portion and the peripheral surface of the second flange portion.

In other word, the one end portion of the flap seal portion of the packing and the first shaft seal portion are present on the same plane. Also, the other end portion of the flap seal portion of the packing and the second shaft seal portion are present on the same plane. Therefore, a good sealing property is achieved.

According to another aspect of the invention, the first flange portion includes a column-shaped first shoulder extending toward the first portion, being coaxial with the first flange portion, and having a diameter smaller than that of the first flange portion and larger than that of the shaft on the surface opposing the first portion of the casing, the second flange portion includes a column-shaped second shoulder extending toward the second portion, being coaxial with the second flange portion, and having a diameter smaller than that of the second flange portion and larger than that of the shaft on the surface opposing the second portion of the casing, the first portion and the second portion of the casing opposing to each other are formed with a first hole and a second hole for allowing insertion of the shaft, the first hole of the first portion of the casing includes a first large diameter portion having a diameter smaller than that of the first flange portion and larger than that of the first shoulder, and a first small diameter portion having a diameter smaller than that of the first shoulder and larger than that of the shaft, and the second hole of the second portion of the casing includes a second large diameter portion having a diameter smaller than that of the second flange portion and larger than that of the second shoulder, and a second small diameter portion having a diameter smaller than that of the second shoulder and larger than that of the diameter of the shaft.

In other words, the first shoulder of the shaft is fitted into the first large diameter portion of the first hole of the first portion of the casing and the shaft is fitted into the first small diameter portion of the first hole of the casing. The second shoulder of the shaft is fitted into the second large diameter portion of the second hole of the casing and the shaft is fitted into the second small diameter portion of the second hole of the casing.

Therefore, the first shoulder of the shaft comes into abutment with the bottom surface of the first large diameter portion of the first hole of the first portion of the casing, and the second shoulder of the shaft comes into abutment with the bottom surface of the second large diameter portion of the second hole of the second portion of the casing, so that the axial positioning of the shaft is achieved, and the pressure of the packing against the inner wall surface of the casing becomes constant, so that the good sealing property is achieved.

DETAILED DESCRIPTION OF THE INVENTION

Figure 1:
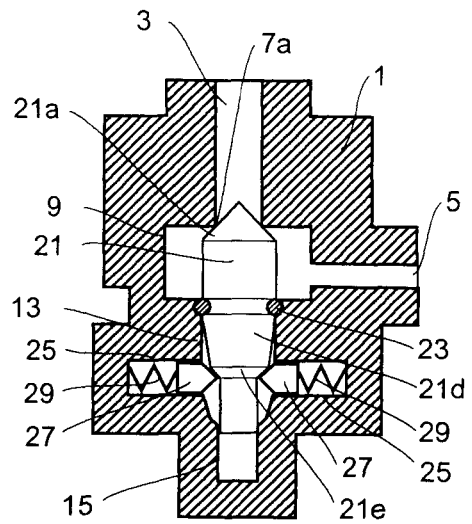
FIG. 1 is a drawing showing a configuration of a one-way valve, in which (a) shows a valve-closed state, and (b) shows a valve-opened state, and (c) shows an exploded perspective view of a principal portion of the valve.
Figure 1:
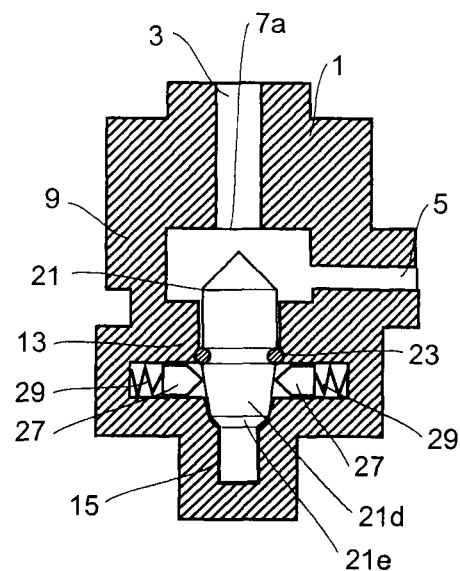
Figure 1:
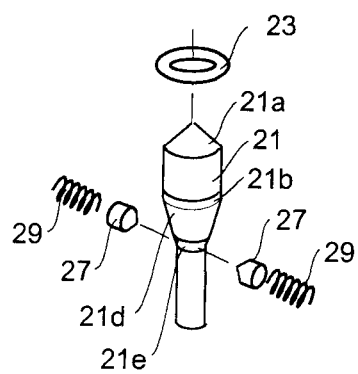

Referring firstly to FIG. 1, the principle of a one-way valve in the present invention will be described. FIG. 1 is a drawing showing a configuration of the one-way valve, in which (a) shows a valve-closed state, and (b) shows a valve-opened state, and (c) shows an exploded perspective view of a principal portion of the valve.

As shown in the drawing (a), a housing 1 is formed with a liquid feed port 3 and a liquid discharge port 5, and a conduit for allowing the flow of liquid (for example, silicone oil) is formed in the interior of the housing 1 from the liquid feed port 3 to the liquid discharge port 5.

In the interior of the housing 1, there is formed a large diameter portion 9 having a circular cross section for being connected to the liquid feed port 3, a first small diameter portion 13 having a circular cross section connected to the large diameter portion 9, and a second small diameter portion 15 connected to the first small diameter portion 13 and having a circular cross section having a smaller diameter than that of the first small diameter portion 13.

The diameter of the liquid feed port 3 is set to be smaller than the diameter of the large diameter portion 9 which functions as a conduit.

Provided in the conduit on the downstream side of the liquid feed port 3 which functions as a hole portion 7a is a valve element (valve) 21 formed of resin or iron extending across the large diameter portion 9, the first small diameter portion 13, and the second small diameter portion 15 so as to be capable of moving in the axial direction. As shown in FIG. 1(a) and (c), one side of the valve element 21 is able to close the liquid feed port 3 by being formed with a conical fitting portion 21a which can be fitted into the liquid feed port 3 and fitted thereto.

A circumferential groove 21b is formed on the peripheral surface of the valve element 21. An annular seal member (O-ring) 23 is provided in the groove 21b. The seal member 23 achieves sealing between the large diameter portion 9 and the second small diameter portion 15. The seal member 23 may be omitted.

A pair of spring holes 25, 25 extending in the direction intersecting the direction of movement of the valve element 21 are formed on the sides of the first small diameter portion 13. Plungers 27, 27 which are able to come into abutment with a peripheral surface of the valve element 21 are provided in the spring holes 25, 25. Springs (urging means) 29, 29 which urge the plungers 27, 27 in the direction of the peripheral surface of the valve element 21 are also provided in the holes 25, 25.

Furthermore, the peripheral surface of the valve element 21 on the opposite side from the fitting portion 21a with respect to the groove 21b is formed with a plurality of surfaces which intersect the direction of movement of the valve element and generate component force in the direction to close the hole portion 7a when urging forces of the springs (coil springs) 29, 29 are applied. In this embodiment, a tapered first surface 21d and a tapered second surface 21e are formed in turn from the hole portion 7a side.

Then, the second surface 21e which is farther from the hole portion 7a is set to provide the component force in the direction to close the hole portion 7a larger than the first surface 21d. In other words, the plurality of surfaces are arranged so as to increase the component force in the direction to close the hole portion 7a as the valve element 21 approaches the hole portion 7a.

In this embodiment, when the angles of the tapered first surface 21d and the tapered second surface 21e of the valve element 21 with respect to a plane orthogonal to the direction of movement of the valve element 21 are expressed by θ1 and θ2, respectively, the θ1 is from 60 to 80°, preferably, from 65 to 75°, and the optimal value is 70°. Also, the angle θ2 is from 20 to 40°, preferably, from 25 to 35°, and the optimal value is 30°.

An operation of the configuration described above will now be described.

In general, as shown in FIG. 1(a), the urging forces of the springs 29, 29 (urging means) are applied to the second surface 21e of the valve element 21, and the one-way valve is in the valve-closed state in which the fitting portion 21a of the valve element 21 closes the hole portion 7a.

When liquid having a high liquid pressure is fed into the liquid feed port 3, the valve element 21 is moved in the direction away from the hole portion 7a against the urging forces of the springs 29, 29, and the one-way valve is brought into the valve-opened state as shown in FIG. 1(b). Then, the urging forces of the springs 29, 29 (urging means) are applied to the first surface 21d of the valve element 21, and the component force in the direction to close the hole portion 7a is reduced, so that the valve-opened state is maintained with liquid having a small liquid pressure.

Then, when the pressure of the liquid at the liquid feed port 3 is eliminated, the valve element 21 is quickly closes the hole portion 7a by the component force of the urging forces of the springs 29, 29 (urging means) in the direction to close the hole portion 7a.

In this configuration, the following effects are achieved.

(1) The urging means for urging the valve element in the axial direction can be omitted, and hence only one type of the urging means is sufficient, so that downsizing and reduction of the components are achieved.

(2) The first surface 21d and the second surface 21e which generate the component force in the direction to close the hole portion 7a when the urging forces of the springs 29, 29 are applied are formed on the peripheral surface of the valve element 21 on the opposite side from the fitting portion 21a with respect to the groove 21b. Therefore, the component force applied to the valve element 21 in the direction to close the hole portion 7a in a state in which the valve element 21 closes the hole portion 7a and the component force applied to the valve element 21 when the valve element 21 is moved in the direction away from the hole portion 7a in the direction to close the hole portion 7a can be set as desired.

(3) The springs (urging means) 29, 29 are provided on the sides of the valve element 21, and hence the one-way valve can be downsized in the direction of the flow of the liquid.

Figure 2:
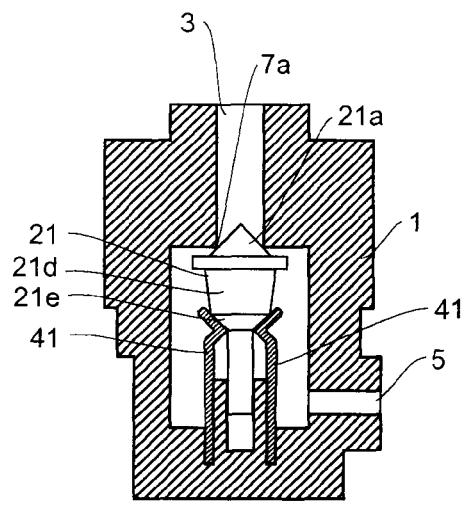
FIG. 2 is a drawing showing a configuration of the one-way valve according to another embodiment, in which (a) shows a valve-closed state, and (b) shows a valve-opened state.
Figure 2:
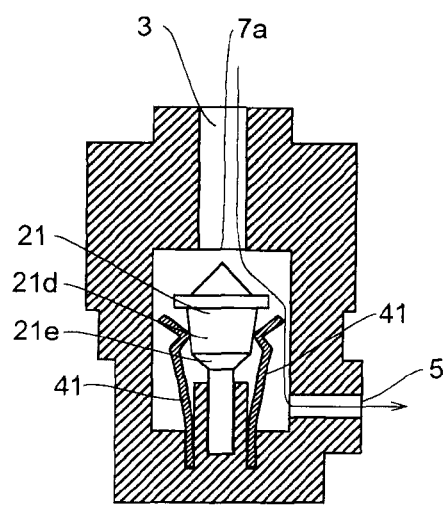

Referring now to FIG. 2, another example of the one-way valve will be described. The different point between this example and the example shown in FIG. 1 is the urging means. In the example shown in FIG. 1, the spring 29 as the urging means is provided on the side of the valve element 21. In this embodiment, leaf springs are employed as the urging means, and the positions to provide the leaf springs are changed, and other portions are the same. Therefore, the same parts are designated by the same reference numerals, and the overlapped description is omitted.

The urging means in this embodiment is a pair of leaf springs 41, 41. The leaf springs 41, 41 are provided along the longitudinal direction of the valve element 21, and are attached to the bottom surface of the housing 1 at one end thereof, and the other ends are able to be brought into press-contact with the first surface 21d and the second surface 21e of the valve element 21.

An operation of the configuration described above will now be described.

In general, as shown in FIG. 2(a), the urging forces of the leaf springs 41, 41 (urging means) are applied to the second surface 21e of the valve element 21, and the one-way valve is in the valve-closed state in which the fitting portion 21a of the valve element 21 closes the hole portion 7a.

Here, when liquid having a high liquid pressure is fed into the liquid feed port 3, the valve element 21 is moved in the direction away from the hole portion 7a against the urging forces of the leaf springs 41, 41, and the one-way valve is brought into the valve-opened state as shown in FIG. 2(b). Then, the urging forces of the leaf springs 41, 41 (urging means) are applied to the first surface 21d of the valve element 21, and the component force in the direction to close the hole portion 7a is reduced, so that the valve-opened state is maintained even with liquid having a small liquid pressure.

Then, when the pressure of the liquid at the liquid feed port 3 is eliminated, the valve element 21 is quickly closes the hole portion 7a by the component force of the urging forces of the leaf springs 41, 41 (urging means) in the direction to close the hole portion 7a.

In this configuration, the following effects are achieved.

(1) Only one type of the urging means is sufficient, so that downsizing and reduction of the components are achieved.

(2) The peripheral surface of the valve element 21 on the opposite side from the fitting portion 21a is formed with the first surface 21d and the second surface 21e which generate the component force in the direction to close the hole portion 7a when the urging forces of the leaf springs 41, 41 are applied, and hence the component force in the direction to close the hole portion 7a applied to the valve element 21 in a state in which the valve element 21 closes the hole portion 7a and the component force in the direction to close the hole portion 7a applied to the valve element 21 when the valve element 21 is moved in the direction away from the hole portion 7a can be set as desired.

Figure 3:
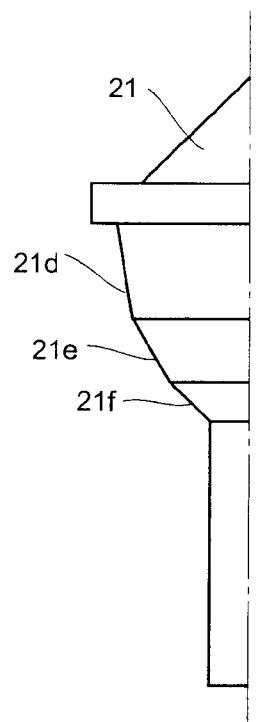
FIG. 3 is an explanatory drawing showing a modification of a valve element of the one-way valve.
Figure 3:
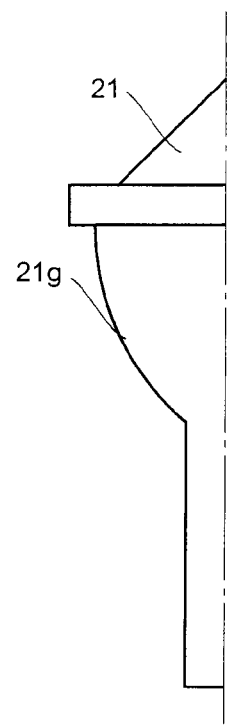
Figure 3:
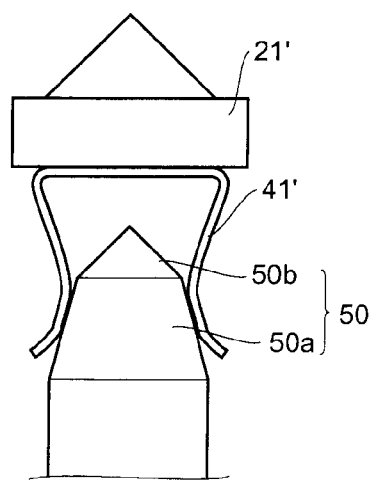

In the embodiment shown above, the plurality of surfaces to be provided on the valve element 21 are described to be the two surfaces, that is, the first surface 21d and the second surface 21e. However, the plurality of surfaces may be composed of the first surface 21d, the second surface 21e, and a third surface 21f as shown in FIG. 3(a). Also, as shown in FIG. 3(b), the peripheral surface of the valve element 21 may be formed with a curved surface 21g which intersects the direction of movement of the valve element and generates the component force in the direction to close the hole portion 7a when the urging forces of the urging means are applied. In this case, the curved surface 21g is formed to increase the component force in the direction to close the hole portion 7a as the valve element 21 approaches the hole portion 7a.

In this manner, the component force in the direction to close the hole portion 7a which is applied to the valve element 21 in the state in which the valve element 21 closes the hole portion 7a and the component force in the direction to close the hole portion 7a which is applied to the valve element 21 when the valve element 21 is moved away from the hole portion 7a can be set further in detail in comparison with the case of forming two surfaces by increasing the number of the plurality of surfaces or forming a curved surface.

Also, in the embodiments shown in FIG. 1 to FIG. 3(b), the examples in which the urging means is provided on the side of the conduit, and the surface which intersects the direction of movement of the valve element and generates the component force in the direction to close the liquid feed port is formed in the valve element 21 when the urging force of the urging means is applied thereto. However, it is also possible to provide the urging means on the side of the valve element and a surface which intersects the direction of movement of the valve element and generate the component force in the direction to close the hole in the valve element when the urging force of the urging means is applied on the conduit side. An example is shown in FIG. 3(c). In the drawing, a leaf spring 41' as the urging means is attached to a valve element 21'. In contrast, a projecting portion 50 formed with a first surface 50a and a second surface 50b which generate the component force in the direction to close the hole portion 7a in the valve element 21' when the leaf spring 41' presses and the urging force of the leaf spring 41' is applied is provided on the conduit side. Then, the second surface 50b which is nearer from the hole portion 7a is set to provide the component force in the direction to close the hole portion 7a larger than the first surface 50a which is farther therefrom. In other words, the plurality of surfaces are arranged so as to increase the component force in the direction to close the liquid feed port as the valve element 21' approaches the hole portion 7a.

Subsequently, an example in which the one-way valve in this configuration is used in a door check apparatus will be described.

Figure 4:
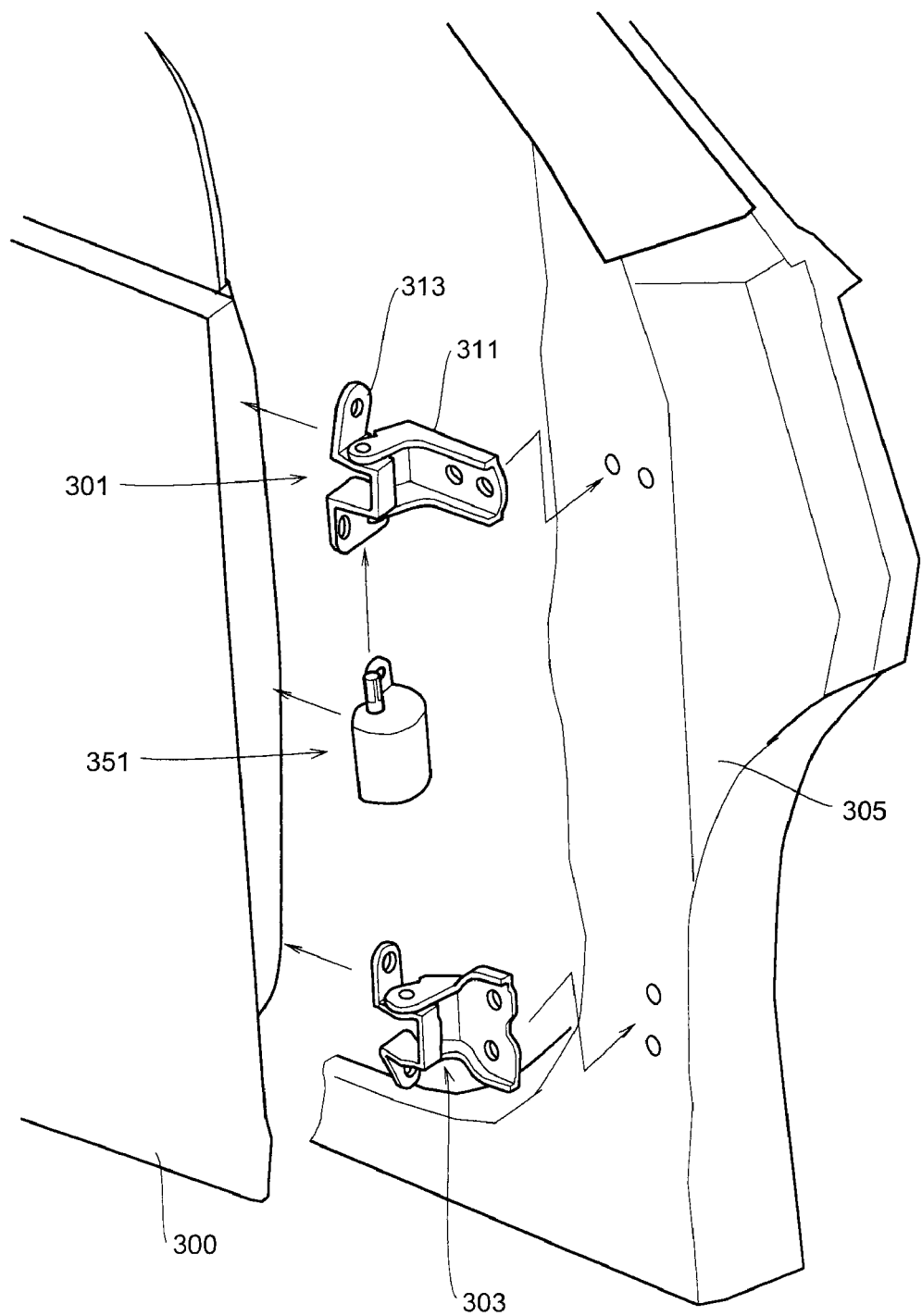
FIG. 4 is an exploded perspective view of a portion around a door provided with a door check apparatus.

First of all, as shown in FIG. 4, a door 300 is rotatably mounted to a body 305 with an upper hinge 301 and a lower hinge 303. Then, a door check apparatus 351 is provided on the side of the upper hinge 301.

Figure 5:
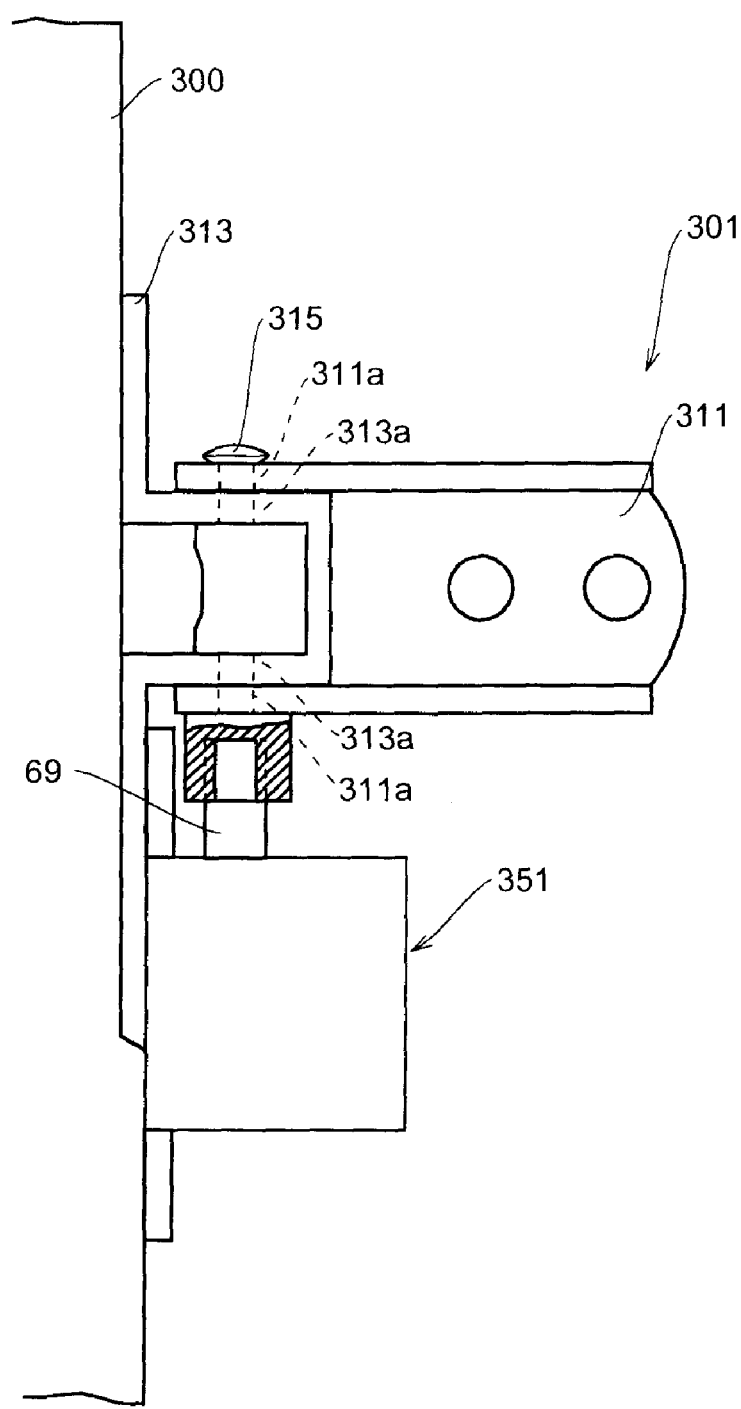
FIG. 5 is an enlarged view of an upper hinge portion in FIG. 4.

As shown in FIG. 5, the upper hinge 301 includes a hinge female 311 to be attached to the body 305 side at the proximal side thereof, a hinge male 313 to be attached to the door 300 side at the proximal side thereof, and a hinge pin 315 to be fitted and secured to a hinge pinhole 311a provided on the distal side of the hinge female 311 and loosely fitted to a hinge pinhole 313a provided on the distal side of the hinge male 313 so as to rotate integrally with the hinge female 311 relatively with respect to the hinge male 313. Then, the door check apparatus 351 is attached to the door 300 side below the hinge male 313, and a shaft 69 of the door check apparatus 351 is coupled to the hinge pin 315, so that the hinge pin 315 and the shaft 69 rotate integrally with each other.

Figure 6:
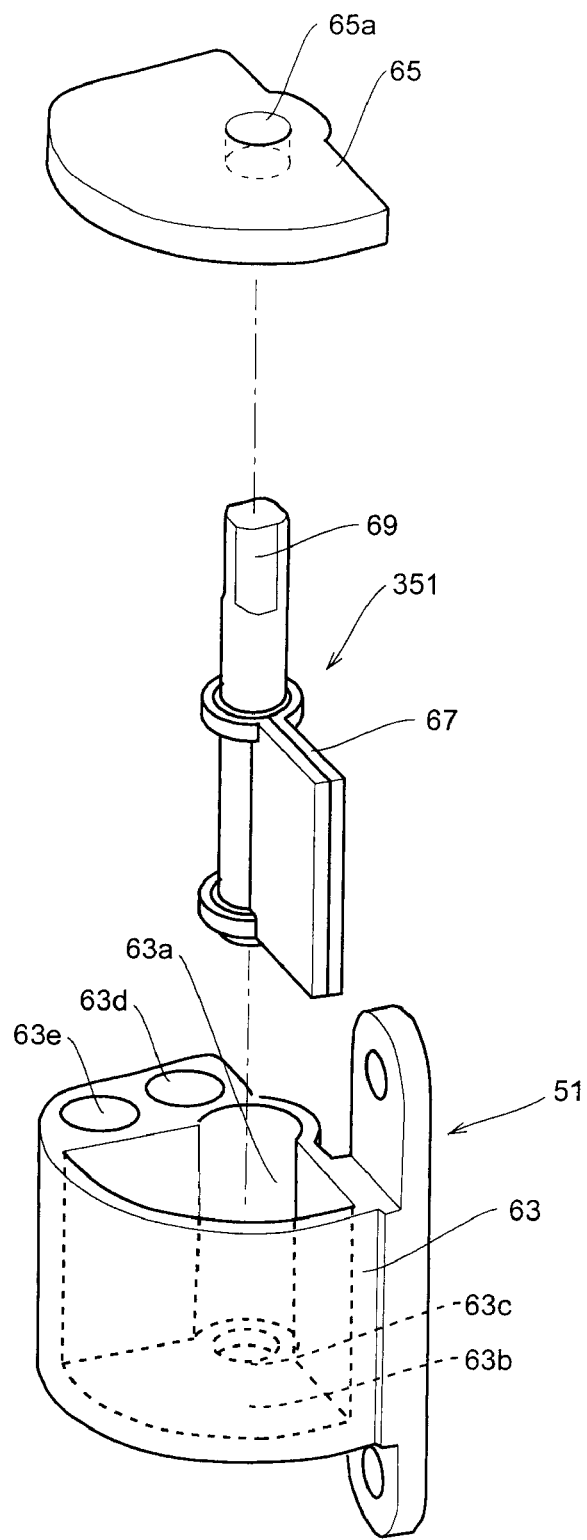
FIG. 6 is an exploded perspective view of the door check apparatus.
Figure 7:
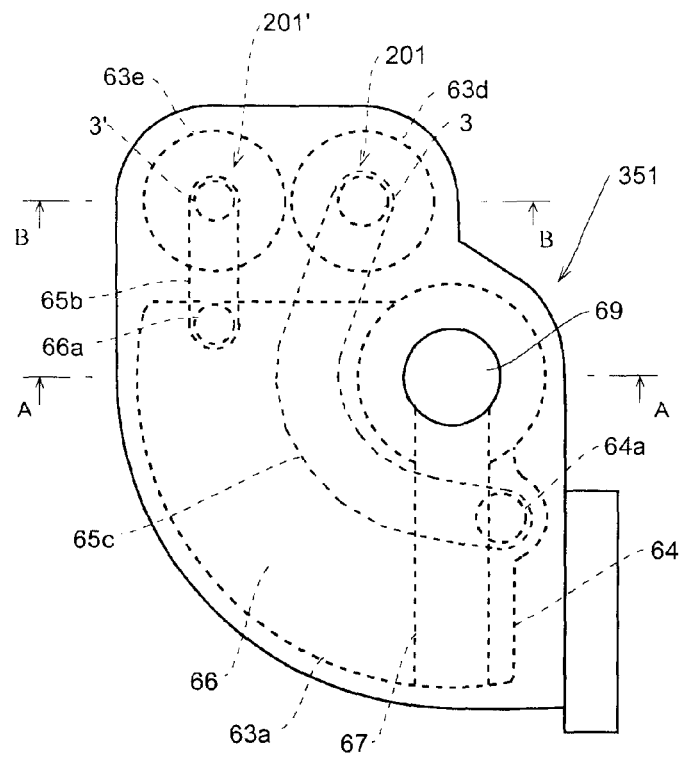
FIG. 7 is a top view of the door check apparatus in FIG. 6.
Figure 8:
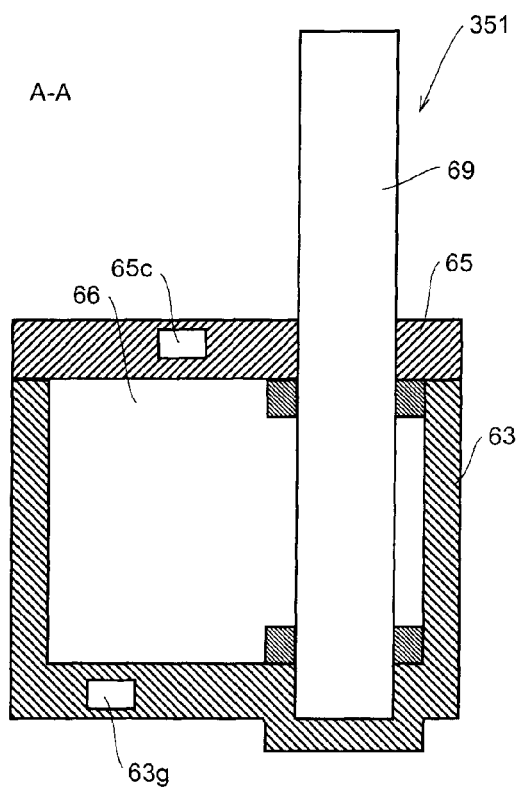
FIG. 8 is a cross-sectional view taken along the line A-A in FIG. 7.
Figure 9:
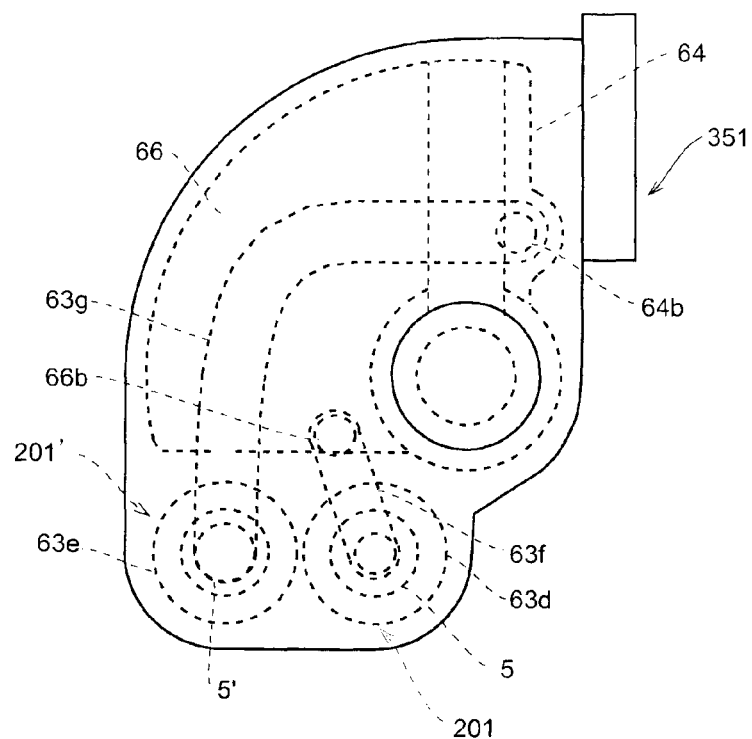
FIG. 9 is a bottom view of the door check apparatus shown in FIG. 6.
Figure 10:
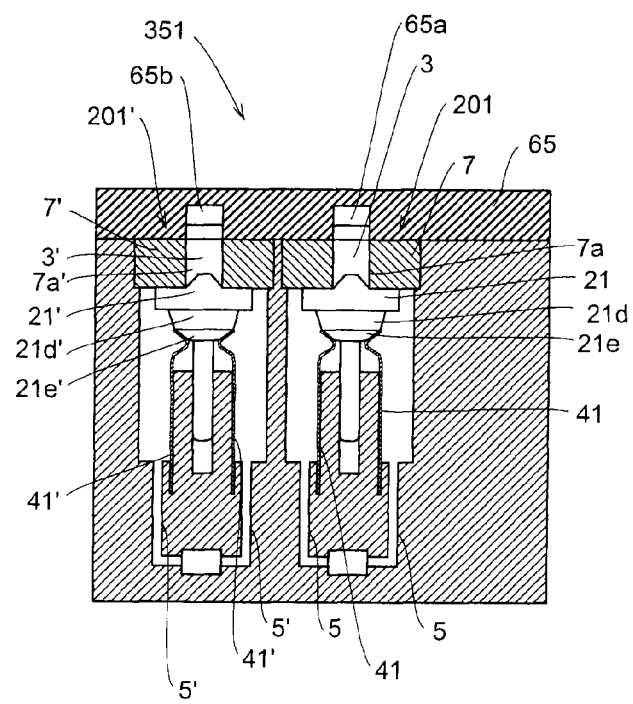
FIG. 10 is a cross-sectional view taken along the line B-B in FIG. 7.

FIG. 6 is an exploded perspective view of the door check apparatus. FIG. 7 to FIG. 10 are explanatory drawings showing the door check apparatus. FIG. 7 is a top view, FIG. 8 is a cross-sectional view taken along the line A-A in FIG. 7, FIG. 9 is a bottom view, and FIG. 10 is a cross-sectional view taken along the line B-B in FIG. 7.

The door check apparatus 351 includes a pump 51, and a pair of one-way valves having the same configuration as the one-way valve described above.

A casing 63 is provided with a hole 63a opening on top and having a substantially fan-shaped cross section. Provided in a hole 63a is a flap 67 for dividing the hole 63a into a first chamber 64 and a second chamber 66. The flap 67 is integrally formed with the shaft 69. Then, the shaft 69 is fitted into a hole 63c formed on a bottom surface 63b of the hole 63a at one end portion thereof, and is fitted into a hole 65a formed on a casing cap 65 at the other end portion thereof, so that the shaft 69 is rotatably supported. Also, liquid such as silicone oil is filled in the hole 63a.

Holes 63d, 63e in which a first valve 201 and a second valve 201' are provided are formed at positions adjacent to the hole 63a. The configurations of the first valve 201 and the second valve 201' are substantially the same as the one-way valve shown in FIG. 2, and hence the same parts are designated by the same reference numerals and the overlapped description is omitted. The different point of the one-way valves in this embodiment from the one-way valve shown in FIG. 2 is that liquid feed ports 3, 3' are formed for facilitating assembly of the valve elements 21, 21' and the leaf springs 41, 41', that restriction members 7, 7' formed with hole portions 7a, 7a' are formed on the valve elements 21, 21' side, and that the position of the liquid discharge port 5 is different.

The first chamber 64 of the pump 51 is formed with two liquid discharge ports, that is, a first liquid discharge port 64a on the casing cap 65 side and a first' liquid discharge port 64b on the bottom surface side of the hole 63a. The second chamber 66 of the pump 51 is also formed with two liquid discharge ports, that is, a second liquid discharge port 66a on the casing cap 65 side and a second' liquid discharge port 66b on the bottom surface side of the hole 63a.

Formed in the casing cap 65 are a conduit 65c for connecting the first liquid discharge port 64a of the first chamber 64 and the liquid feed port 3 of the first valve 201, and a conduit 65b for connecting the second liquid discharge port 66a of the second chamber 66 and the liquid feed port 3' of the second valve 201'.

Formed in the casing 63 on the bottom surface side of the hole 63a are a conduit 63f for connecting the second' liquid discharge port 66b of the second chamber 66 and the liquid discharge port 5 of the first valve 201, and a conduit 63g for connecting the first' liquid discharge port 64b of the first chamber 64 and the liquid discharge port 5' of the second valve 201'.

Therefore, a first conduit connected to the first liquid discharge port 64a of the pump 51 at one end thereof and to the second' liquid discharge port 66b of the pump 51 at the other end thereof is formed by the conduit 65c and the conduit 63f connected to the conduit 65c via the first valve 201, and the first valve 201 is provided in the first conduit.

Also, a second conduit connected to the second liquid discharge port 66a of the pump 51 at one end thereof and to the first' liquid discharge port 64b of the pump 51 at the other end thereof is formed by the conduit 65b and the conduit 63g connected to the conduit 65b via the second valve 201', and the second valve 201' is provided in the second conduit.

An operation of the configuration described above will now be described.

In general, urging forces of the leaf springs (urging means) 41, 41' of the first valve 201 and the second valve 201' press the second surfaces 21e, 21e' of the valve elements 21, 21', and hence the component force in the direction to close the hole portions 7a, 7a' is generated, so that the valve elements 21, 21' close the hole portions 7a, 7a'.

When the door rotates, the flap 67 rotates according to the direction of rotation of the door and liquid is then about to be discharged from one of the first liquid discharge port 64a and the first' liquid discharge port 64b, and the second liquid discharge port 66a and the second' liquid discharge port 66b of the pump 51.

For example, when the door rotates in the opening direction and hence the liquid is about to be discharged from the first liquid discharge port 64a and the first' liquid discharge port 64b of the pump 51, the valve element 21 of the first valve 201 is pressed by the liquid pressure of the liquid passed through the conduit 65c in the direction away from the hole portion 7a. The valve element 21' of the second valve 201' is pressed by the liquid pressure of the liquid passed through the conduit 63g in the direction to close the hole portion 7a'.

When the valve element 21 in the first valve 201 moves in the direction away from the hole portion 7a against the urging force of the leaf spring (urging means) 41 by the liquid pressure, the leaf spring 41 presses the first surface 21d of the valve element 21, and hence the component force in the direction to close the hole portion 7a is reduced. In other words, when the door is operated to rotate, a large operating force is required at the beginning. When the rotation of the door is started, however, the operating force required to rotate the door is lightened. Then, the liquid which has pressed the valve element 21 of the first valve 201 passes through the conduit 63f from the liquid discharge port 5 of the first valve 201, and is fed into the second chamber 66 of the pump 51.

When the operation to rotate the door is stopped, the valve element 21 of the first valve 201 quickly closes the hole portion 7a by the component force of the urging force of the leaf spring (urging means) 41 in the direction to close the hole portion 7a. At this time, since a large operating force for rotating the door is required to move the valve element 21 in the direction away from the hole portion 7a, the state in which the rotating operation of the door is stopped is easily maintained.

Also, when the door rotates in the closing direction and the liquid is about to be discharged from the second liquid discharge port 66a and the second' liquid discharge port 66b of the pump 51, the valve element 21' of the second valve 201' is pressed by the liquid pressure of the liquid passed through the conduit 65b in the direction away from the hole portion 7a'. Also, the valve element 21 of the first valve 201 is pressed by the liquid pressure of the liquid passed through the conduit 63f in the direction to close the hole portion 7a. When the valve element 21' in the second valve 201' moves in the direction away from the hole portion 7a' against the urging force of the leaf spring (urging means) 41' by the liquid pressure, the leaf spring 41' presses a first surface 21d' of the valve element 21', and hence the component force in the direction to close the hole portion 7a' is reduced. In other words, when the door is operated to rotate, a large operating force is required at the beginning. When the rotation of the door is started, however, the operating force required to rotate the door is lightened. Then, the liquid which has pressed the valve element 21' of the second valve 201' passes through the conduit 63g from the liquid discharge port 5' of the second valve 201', and is fed into the first chamber 64 of the pump 51.

When the operation to rotate the door is stopped, the valve element 21' of the second valve 201' quickly closes the hole portion 7a' by the component force of the urging force of the leaf spring (urging means) 41' in the direction to close the hole portion 7a'. At this time, since a large operating force for rotating the door is required to move the valve element 21' in the direction away from the hole portion 7a', the state in which the rotating operation of the door is stopped is easily maintained.

Figure 11:
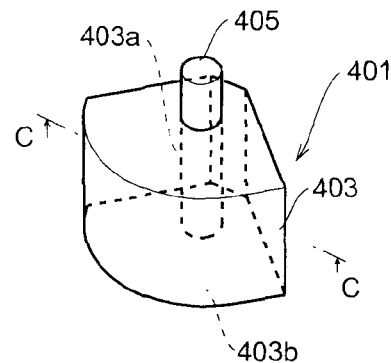
FIG. 11 is an appearance view of the door check apparatus according to another embodiment.
Figure 12:
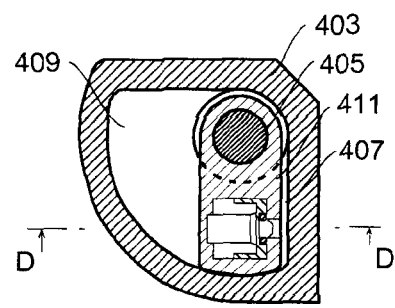
FIG. 12 is a cross-sectional view taken along the line C-C in FIG. 11.
Figure 13:
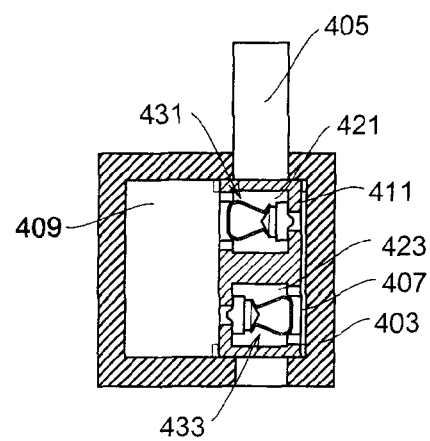
FIG. 13 is a cross-sectional view taken along the line D-D in FIG. 12.

Furthermore, the door check apparatus is not limited to the embodiment shown above. The configuration shown in FIG. 11 to FIG. 13 is also applicable. FIG. 11 is an appearance view of the door check apparatus, FIG. 12 is a cross-sectional view taken along the line C-C in FIG. 11, and FIG. 13 is a cross-sectional view taken along the line D-D in FIG. 12. As shown in these drawings, liquid is filled in a casing 403 of a door check apparatus 401. Arranged in the casing 403 is a shaft 405, which is rotatably supported by a first portion (upper portion) 403a and a second portion (lower portion) 403b of the casing 403 opposed to each other.

A flap 411 for dividing the interior of the casing into a first chamber 407 and a second chamber 409 is provided on the peripheral surface of the shaft.

The flap 411 is formed with a first conduit 421 and a second conduit 423 in such a manner that one of the openings faces the first chamber 407 and the other opening faces the second chamber 409, respectively.

The first conduit 421 and the second conduit 423 are provided with a first one-way valve 431 and a second one-way valve 433 described in conjunction with FIG. 2. The first one-way valve 431 is adapted to be the opened state when the liquid pressure in the first chamber 407 increases, and the second one-way valve 433 is adapted to be the opened state when the liquid pressure in the second chamber 409 increases.

In this configuration, since the flap 411 is formed with the first conduit 421 and the second conduit 423 in such a manner that one of the openings faces the first chamber 407 and the other opening faces the second chamber 409 respectively, and the first conduit 421 and the second conduit 423 are provided respectively with the one-way valves, so that downsizing of the door check apparatus is achieved.

Furthermore, the door check apparatus different from the mode shown above is also applicable.

Figure 14:
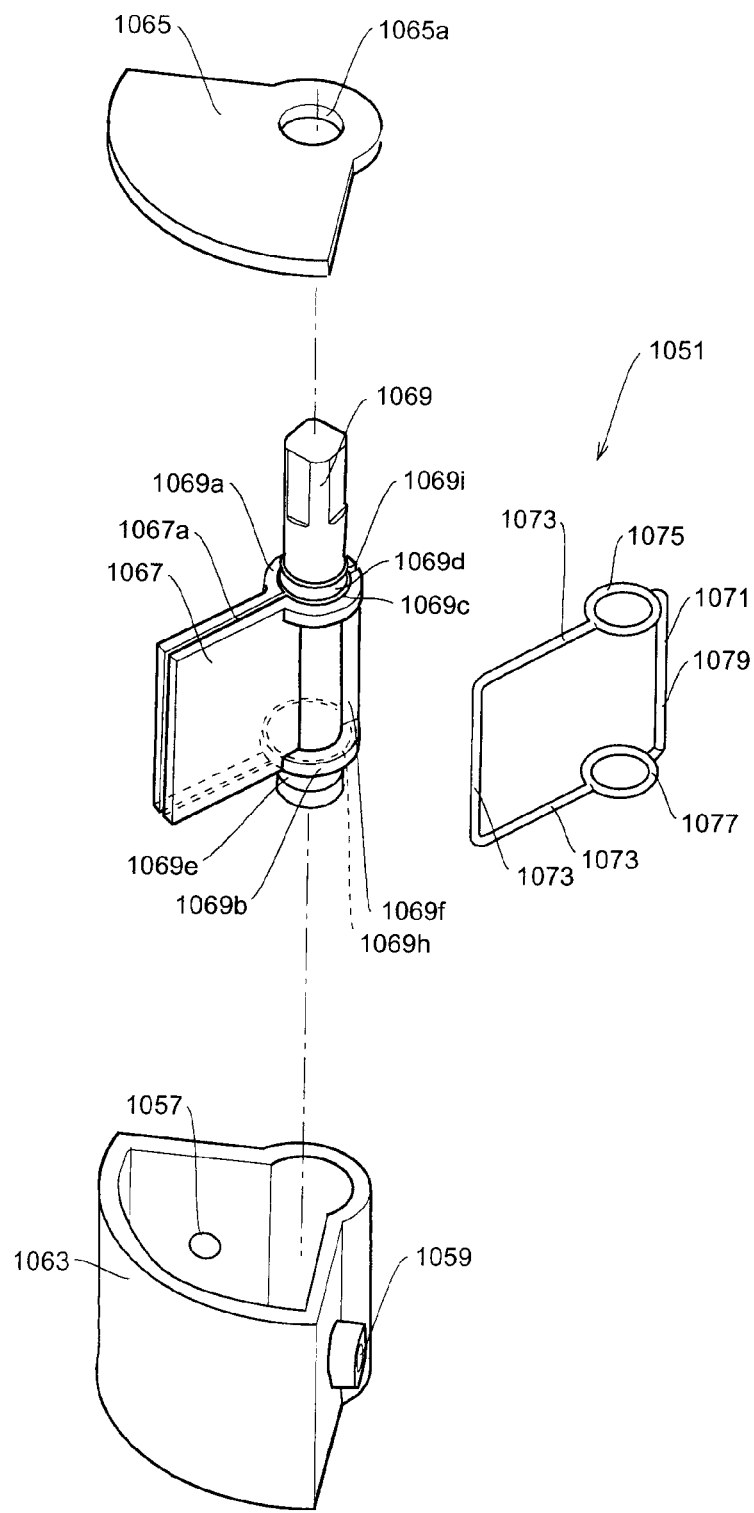
FIG. 14 is an exploded perspective view of a pump in FIG. 15.
Figure 15:
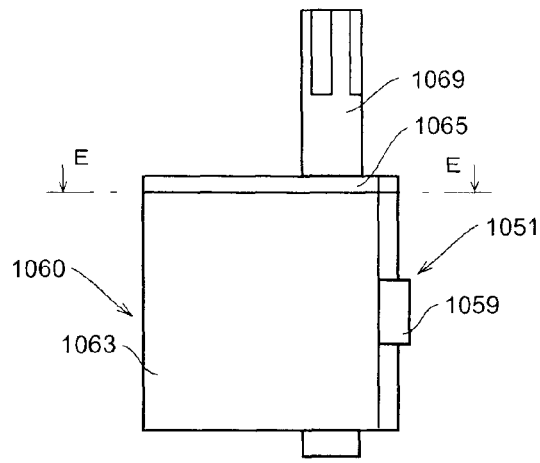
FIG. 15 is a side view of the pump according to another embodiment.
Figure 16:
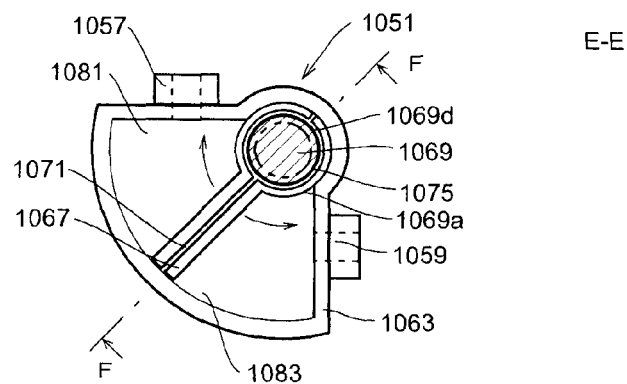
FIG. 16 is a cross-sectional view taken along the line E-E in FIG. 15.
Figure 17:
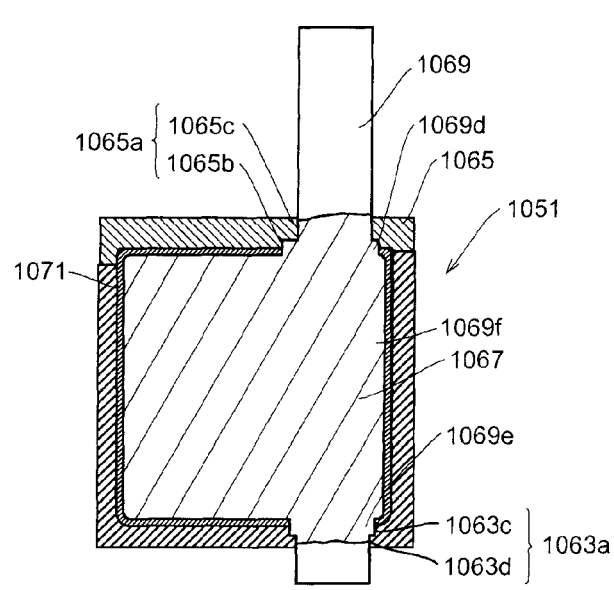
FIG. 17 is a cross-sectional view taken along the line F-F in FIG. 16.

As a pump used for such the door check apparatus, there is a one shown in FIG. 14 to FIG. 17. FIG. 14 is an exploded perspective view of a pump shown in FIG. 15; FIG. 15 is a side view of the pump, FIG. 16 is a cross-sectional view taken along the line E-E in FIG. 15, and FIG. 17 is a cross-sectional view taken along the line F-F in FIG. 16.

As shown in FIG. 14 to FIG. 17, a pump 1051 includes a hollow cylindrical casing body 1063 having a bottom surface of a substantially fan shape and opening on top, and a casing cap 1065 provided so as to close the opened surface of the casing body 1063. The casing body 1063 and the casing cap 1065 constitute a casing 1060.

Provided in the casing body 1063 is a flap 1067 for dividing the interior of the casing body 1063 into a first chamber 1081 and a second chamber 1083. The flap 1067 is integrally formed with a shaft 1069. Then, the shaft 1069 is fitted into a second hole 1063a formed on the bottom surface (second portion) of the casing body 1063 at one end portion thereof and is fitted into a first hole 1065a formed on the casing cap 1065 (first portion) at the other end portion thereof, so that the shaft 1069 is rotatably supported. Liquid is filled in the casing 1060.

The flap 1067 and the shaft 1069 are provided with a packing 1071 for sealing inner wall surfaces of the casing body 1063 and the casing cap 1065 with respect to the flap 1067 and the shaft 1069.

The packing 1071 in this embodiment is an integrated molding formed of an elastic material such as rubber, and as shown in FIG. 14, has portions as shown below.

(1) A flap seal portion 1073 provided along surfaces of the flap 1067 opposing the inner wall surface of the casing 1060 other than surfaces opposing the first chamber 1081 and the second chamber 1083 and pressed against the inner wall surface of the casing 1060.

(2) An annular first shaft seal portion 1075 connected to one end portion of the flap seal portion 1073, provided circumferentially of the shaft 1069 on the peripheral surface of the shaft 1069, and pressed against the inner wall surface of the first portion of the casing 1060.

(3) An annular second shaft seal portion 1077 connected to the other end portion of the flap seal portion 1073, provided circumferentially of the shaft 1069 on the peripheral surface of the shaft 1069, and pressed against the inner wall surface of the second portion of the casing 1060.

(4) A third shaft seal portion 1079 connected to the first shaft seal portion 1075 at one end portion thereof and to the second shaft seal portion 1077 at the other end portion thereof, having a midsection extending on the peripheral surface of the shaft 1069 along the axial direction of the shaft 1069, and pressed against the inner wall surface of the casing 1060.

Formed on the peripheral surface of the shaft 1069 on the side of the casing cap 1065 (first portion) of the casing 1060 is a first flange portion 1069a having a surface flush with the surface of the flap 1067 where one end portion of the flap seal portion 1073 is provided and having a diameter larger than the diameter of the shaft 1069. Also, formed on the peripheral surface of the shaft 1069 on the side of the bottom surface (second portion) of the casing body 1063 of the casing 1060 is a second flange portion 1069b having a surface flash with the surface of the flap 1067 where the other end portion of the flap seal portion 1073 is provided, having the same diameter as that of the first flange portion 1069a, and having a diameter larger than that of the shaft 1069. The shaft 1069 is further formed with an axial projection 1069f along the axial direction thereof from the first flange portion 1069a to the second flange portion 1069b, and the axial projection 1069f extends so as to be flush with the peripheral surface of the first flange portion 1069a and the peripheral surface of the second flange portion 1069b.

The first flange portion 1069a is provided with the first shaft seal portion 1075 of the packing 1071, the second flange portion 1069b is provided with the second shaft seal portion 1077 of the packing 1071, and the axial projection 1069f is provided with the third shaft seal portion 1079 of the packing 1071.

The first flange portion 1069a is formed with a column-shaped first shoulder 1069d extending toward the casing cap 1065 (first portion), being coaxial with the first flange portion 1069a, and having a diameter smaller than that of the first flange portion 1069a and larger than that of the shaft 1069 on the surface opposing the casing cap 1065 (first portion) of the casing 1060.

The second flange portion 1069b is formed with a column-shaped second shoulder 1069e extending toward the bottom surface (second portion) of the casing body 1063, being coaxial with the second flange portion 1069b, and having a diameter smaller than that of the second flange portion 1069b and larger than that of the shaft 1069 on the surface opposing the bottom surface (second portion) of the casing body 1063 of the casing 1060.

The first hole 1065a of the casing cap 1065 (first portion) of the casing 1060 includes the first large diameter portion 1065b having a diameter smaller than that of the first flange portion 1069a and larger than that of the first shoulder 1069d, and the first small diameter portion 1065c having a diameter smaller than that of the first shoulder 1069d and larger than that of the shaft 1069. In contrast, the second hole 1063a of the bottom surface (second portion) of the casing body 1063 of the casing 1060 includes the second large diameter portion 1063c having a diameter smaller than that of the second flange portion 1069b and larger than that of the second shoulder 1069e, and the second small diameter portion 1063d having a diameter smaller than that of the second shoulder 1069e and larger than that of the shaft 1069.

Then, the flap 1067 is formed with a groove 1067a on the surfaces other than the surfaces opposing the first chamber 1081 and the second chamber 1083 for fitting the flap seal portion 1073 of the packing 1071. The first flange portion 1069a of the shaft 1069 is formed with a groove 1069c connected to the groove 1067a of the flap 1067 for fitting the first shaft seal portion 1075 of the packing 1071. The second flange portion 1069b of the shaft 1069 is formed with a groove 1069h connected to the groove 1067a of the flap 1067 for fitting the second shaft seal portion 1077 of the packing 1071. An axial projection 1069f of the shaft 1069 is formed with a groove 1069i connected at one end thereof to the groove 1069c and connected at the other end thereof to the groove 1069h, and having a midsection extending on the peripheral surface of the shaft 1069 along the axial direction of the shaft 1069 for fitting the third shaft seal portion 1079 of the packing 1071.

In this configuration, the following effects are achieved.

(1) Since the packing 1071 includes the flap seal portion 1073 provided along surfaces of the flap 1067 opposing the inner wall surface of the casing 1060 other than surfaces opposing the first chamber 1081 and the second chamber 1083 and pressed against the inner wall surface of the casing 1060, the annular first shaft seal portion 1075 connected to one end portion of the flap seal portion 1073, provided in the circumferential direction of the shaft 1069 on the peripheral surface of the shaft 1069, and pressed against the inner wall surface of the first portion of the casing 1060, the annular second shaft seal portion 1077 connected to the other end portion of the flap seal portion 1073, provided in the circumferential direction of the shaft 1069 on the peripheral surface of the shaft 1069, and pressed against the inner wall surface of the second portion of the casing 1060, and the third shaft seal portion 1079 connected to the first shaft seal portion 1075 at one end portion thereof and to the second shaft seal portion 1077 at the other end portion thereof, having a midsection extending on the peripheral surface of the shaft 1069 along the axial direction of the shaft 1069, and pressed against the inner wall surface of the casing 1060, the packing 1071 is an integral member, so that a good sealing property is achieved.

(2) Since the packing 1071 is fitted into the groove 1067a of the flap 1067, the groove 1069c of the first flange portion 1069a of the shaft 1069, the groove 1069h of the second flange portion 1069b, and the groove 1069i of the axial projection 1069f, it hardly comes off.

(3) Since the packing 1071 has elasticity, it is easy to attach.

(4) The first flange portion 1069a has a surface flush with the surface where one end portion of the flap seal portion 1073 of the flap 1067 is provided. The second flange portion 1069b has a surface flush with the surface where the other end portion of the flap seal portion 1073 of the flap 1067 is provided. Furthermore, the axial projection 1069f extends so as to be flush with the peripheral surface of the first flange portion 1069a and the peripheral surface of the second flange portion 1069b. In other words, one end portion of the flap seal portion 1073 of the packing 1071 and the first shaft seal portion 1075 are present on the same plane. Also, the other end portion of the flap seal portion 1073 of the packing 1071 and the second shaft seal portion 1077 are present on the same plane. Therefore, a good sealing property is achieved.

(5) The first flange portion 1069a is formed with the column-shaped first shoulder 1069d extending toward the casing cap 1065 (first portion), being coaxial with the first flange portion 1069a, and having a diameter smaller than that of the first flange portion 1069a and larger than that of the shaft 1069 on the surface opposing the casing cap 1065 (first portion) of the casing 1060.

The second flange portion 1069b is formed with the column-shaped second shoulder 1069e extending toward the bottom surface (second portion) of the casing body 1063, being coaxial with the second flange portion 1069b, and having a diameter smaller than that of the second flange portion 1069b and larger than that of the shaft 1069 on the surface opposing the bottom surface (second portion) of the casing body 1063 of the casing 1060.

A first hole 1065a of the casing cap 1065 (first portion) of the casing 1060 includes a first large diameter portion 1065b smaller than that of the first flange portion 1069a and larger than that of the first shoulder 1069d, and a first small diameter portion 1065c having a diameter smaller than that of the first shoulder 1069d and larger than that of the shaft 1069. In contrast, a second hole 1063a of the bottom surface (second portion) of the casing body 1063 of the casing 1060 includes a second large diameter portion 1063c having a diameter smaller than that of the second flange portion 1069b and larger than that of the second shoulder 1069e, and a second small diameter portion 1063d having a diameter smaller than that of the second shoulder 1069e and larger than that of the shaft 1069.

In other words, the first shoulder 1069d of the shaft 1069 is fitted into the first large diameter portion 1065b of the first hole 1065a of the casing cap 1065 (first portion) of the casing 1060 and the shaft 1069 is fitted into the first small diameter portion 1065c of the first hole 1065a of the casing 1060. The second shoulder 1069e of the shaft 1069 is fitted into the second large diameter portion 1063c of the second hole 1063a of the bottom surface (second portion) of the casing body 1063 of the casing 1060, and the shaft 1069 is fitted into the second small diameter portion 1063d of the second hole 1063a of the casing 1060.

Therefore, the first shoulder 1069d of the shaft 1069 comes into abutment with the bottom surface of the first large diameter portion 1065b of the first hole 1065a of the casing 1060, and the second shoulder 1069e of the shaft 1069 comes into abutment with the bottom surface of the second large diameter portion 1063c of the second hole 1063a of the casing 1060, so that the axial positioning of the shaft 1069 is achieved, and the pressure of the packing 1071 against the inner wall surface of the casing 1060 becomes constant, so that the good sealing property is achieved.

(6) In this manner, with the usage of the pump 1051 having the good sealing property, fluctuations of the door check apparatus is avoided.

Needless to say, the flap 1067 of the pump 1051 and the packing 1071 provided on the shaft 1069 may be applied to the flap 411 and the shaft 405 of the door check apparatus 401 shown in FIG. 12 and FIG. 13.

In the drawings, 7a is a hole portion;
21 is a valve element;
21d is a first surface;
21e is a second surface; and
29 is a spring.

The invention claimed is:

1. A door check apparatus comprising:
a pump having first and second chambers separated by a movable wall that is connectable to a door so as to move as the door moves, the pump having a first conduit extending from a first liquid discharge port of the first chamber to the second chamber and a second conduit extending from a first liquid discharge port of the second chamber to the first chamber for discharging liquid from the first chamber or second chamber according to a direction of rotation of the door;
a first one-way valve having: a valve element provided in the first conduit; a hole portion provided in the first conduit on the upstream side of the valve element and configured to be brought into a closed state by being closed by the valve element; and urging means that urges the valve element in the direction to close the hole portion, in which the urging means is provided on one of the first conduit side and the valve element side, a surface which intersects the direction of movement of the valve element and generates a component force in the direction to close the hole portion in the valve element when an urging force of the urging means is applied thereon is formed on the other one of the first conduit side and the valve element side, the surface is formed so as to generate a larger component force in the direction to close the hole portion as the valve element approaches the hole portion, the urging means constantly presses the surface from the direction intersecting the direction of movement of the valve element to constantly apply the urging force on the valve element in the direction to close the hole portion, and the flow of the liquid from the interior of the first chamber of the pump through the first liquid discharge port of the first chamber to the interior of the first conduit is allowed and the flow of the liquid in the opposite direction is prevented; and
a second one-way valve having: a valve element provided in the second conduit, a hole portion provided in the second conduit on the upstream side of the valve element and configured to be brought into a closed state by being closed by the valve element, and an urging means that urges the valve element in the direction to close the hole portion, in which the urging means is provided on one of the second conduit side and the valve element side, a surface which intersects the direction of movement of the valve element and generates a component force in the direction to close the hole portion in the valve element when an urging force of the urging means is applied thereon is formed on the other one of the second conduit side and the valve element side, the surface is formed so as to generate a larger component force in the direction to close the hole portion as the valve element approaches the hole portion, the urging means constantly presses the surface from the direction intersecting the direction of movement of the valve element to constantly apply the urging force on the valve element in the direction to close the hole portion, and the flow of the liquid from the interior of the second chamber of the pump through the first liquid discharge port of the second chamber to the interior of the second conduit is allowed and the flow of the liquid in the opposite direction is prevented.

2. The door check apparatus according to claim 1, characterized in that the pump includes:

a casing to be filled with liquid;

a shaft arranged in the casing, rotatably supported by a first portion and a second portion of the casing opposing to each other and rotating according to the rotation of the door;

a flap provided on the peripheral surface of the shaft forming said wall for dividing the interior of the casing into said first chamber and said second chamber;

the first liquid discharge port provided on the first chamber side of the casing; and the second liquid discharge port provided on the second chamber side of the casing, and the pump discharges the liquid from the first liquid discharge port or the second liquid discharge port according to the direction of rotation of the shaft;

in that a packing formed of an elastic material is provided, the packing having:

a flap seal portion provided along surfaces of the flap opposing the inner wall surface of the casing other than surfaces opposing the first chamber and the second chamber and pressed against the inner wall surface of the casing;

an annular first shaft seal portion connected to one end portion of the flap seal portion, provided in the circumferential direction of the shaft on the peripheral surface of the shaft, and pressed against the inner wall surface of the first portion of the casing;

an annular second shaft seal portion connected to the other end portion of the flap seal portion, provided in the circumferential direction of the shaft on the peripheral surface of the shaft, and pressed against the inner wall surface of the second portion of the casing; and a third shaft seal portion connected to the first shaft seal portion at one end portion thereof and to the second shaft seal portion at the other end portion thereof, having a midsection extending on the peripheral surface of the shaft along the axial direction of the shaft, and pressed against the inner wall surface of the casing; and in that a groove is formed on the flap and the shaft for fitting the packing.

3. A door check apparatus comprising:

a casing to be filled with liquid;

a shaft arranged in the casing rotatably supported by a first portion and a second portion of the casing which oppose to each other;

a flap provided on a peripheral surface of the shaft for dividing the interior of the casing into a first chamber and a second chamber;

a first conduit and a second conduit provided respectively on the flap in such a manner that one of the openings of each conduit faces the first chamber and the other opening of each conduit faces the second chamber;

a first one-way valve having: a valve element provided in the first conduit; a hole portion provided in the first conduit on the upstream side of the valve element and configured to be brought into a closed state by being closed by the valve element; and urging means that urges the valve element in the direction to close the hole portion, in which the urging means is provided on one of the first conduit side and the valve element side, a surface which intersects the direction of movement of the valve element and generates a component force in the direction to close the hole portion in the valve element when an urging force of the urging means is applied thereon is formed on the other one of the first conduit side and the valve element side, the surface is formed so as to generate a larger component force in the direction to close the hole portion as the valve element approaches the hole portion, the urging means constantly presses the surface from the direction intersecting the direction of movement of the valve element to constantly apply the urging force on the valve element in the direction to close the hole portion, and the flow of the liquid from the first chamber to the second chamber is allowed and the flow of the liquid from the second chamber to the first chamber is prevented; and a second one-way valve having: a valve element provided in the second conduit, a hole portion provided in the second conduit on the upstream side of the valve element and configured to be brought into a closed state by being closed by the valve element, and an urging means that urges the valve element in the direction to close the hole portion, in which the urging means is provided on one of the second conduit side and the valve element side, a surface which intersects the direction of movement of the valve element and generates a component force in the direction to close the hole portion in the valve element when an urging force of the urging means is applied thereon is formed on the other one of the second conduit side and the valve element side, the surface is formed so as to generate a larger component force in the direction to close the hole portion as the valve element approaches the hole portion, the urging means constantly presses the surface from the direction intersecting the direction of movement of the valve element to constantly apply the urging force on the valve element in the direction to close the hole portion, and the flow of the liquid from the second chamber to the first chamber is allowed and the flow of the liquid from the first chamber to the second chamber is prevented.

4. The door check apparatus according to claim 3, comprising:

a packing formed of an elastic material, the elastic material including:

a flap seal portion provided along surfaces of the flap opposing the inner wall surface of the casing other than surfaces opposing the first chamber and the second chamber and pressed against the inner wall surface of the casing;

an annular first shaft seal portion connected to one end portion of the flap seal portion, provided in the circumferential direction of the shaft on the peripheral surface of the shaft, and pressed against the inner wall surface of the first portion of the casing;

an annular second shaft seal portion connected to the other end portion of the flap seal portion, provided in the circumferential direction of the shaft on the peripheral surface of the shaft, and pressed against the inner wall surface of the second portion of the casing; and a third shaft seal portion connected to the first shaft seal portion at one end portion thereof and to the second shaft seal portion at the other end portion thereof, having a midsection extending on the peripheral surface of the shaft along the axial direction of the shaft, and pressed against the inner wall surface of the casing, characterized in that a groove is formed on the flap and the shaft for fitting the packing.

5. The door check apparatus according to claim 4 or claim 2, characterized in that the peripheral surface of the shaft on the side of the first portion of the casing includes a first flange portion having a surface flush with the surface on which one end portion of the flap seal portion of the flap is provided and having a diameter larger than the diameter of the shaft, the peripheral surface of the shaft on the side of the second portion of the casing includes a second flange portion having a surface flush with the surface on which the other end portion of the flap seal portion of the flap is provided, and having the same diameter as the first flange portion, the shaft is formed with an axial projection along the axial direction thereof from the first flange portion to the second flange portion, the axial projection extends so as to be flush with the peripheral surface of the first flange portion and the peripheral surface of the second flange portion, the first flange portion includes a first shaft seal portion of the packing, the second flange portion includes a second shaft seal portion of the packing, and the axial projection includes a third shaft seal portion of the packing.

6. The door check apparatus according to claim 5, characterized in that the first flange portion includes a column-shaped first shoulder extending toward the first portion, being coaxial with the first flange portion, and having a diameter smaller than that of the first flange portion and larger than that of the shaft on the surface opposing the first portion of the casing, the second flange portion includes a column-shaped second shoulder extending toward the second portion, being coaxial with the second flange portion, and having a diameter smaller than that of the second flange portion and larger than that of the shaft on the surface opposing the second portion of the casing, the first portion and the second portion of the casing opposing to each other are formed with a first hole and a second hole for allowing insertion of the shaft, the first hole of the first portion of the casing includes a first large diameter portion having a diameter smaller than that of the first flange portion and larger than that of the first shoulder, and a first small diameter portion having a diameter smaller than that of the first shoulder and larger than that of the shaft, and the second hole of the second portion of the casing includes a second large diameter portion having a diameter smaller than that of the second flange portion and larger than that of the second shoulder, and a second small diameter portion having a diameter smaller than that of the second shoulder and larger than that of the shaft.

\* \* \* \* \*